(12) United States Patent
Marshall et al.

(10) Patent No.: US 7,027,480 B2
(45) Date of Patent: *Apr. 11, 2006

(54) LASER LEVEL

(75) Inventors: James D. Marshall, Mallorytown (CA); Oleksiy P. Sergyeyenko, Brockville (CA); Colin M. Dyke, Ontario (CA)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/693,439

(22) Filed: Oct. 24, 2003

(65) Prior Publication Data

US 2004/0111898 A1    Jun. 17, 2004

Related U.S. Application Data

(63) Continuation-in-part of application No. 10/277,474, filed on Oct. 22, 2002, now Pat. No. 6,914,930.

(60) Provisional application No. 60/384,673, filed on May 31, 2002.

(51) Int. Cl.
*H01S 3/00* (2006.01)
*G01C 15/00* (2006.01)
*G01C 5/00* (2006.01)

(52) U.S. Cl. .................... 372/109; 33/227; 33/286; 33/290; 33/291

(58) Field of Classification Search ........... 372/109; 33/227, 286, 290, 291; 367/99, 128; 356/3, 356/3.01
See application file for complete search history.

(56) References Cited

U.S. PATENT DOCUMENTS

| | | | | |
|---|---|---|---|---|
| 4,451,909 A | * | 5/1984 | Kodera et al. | 367/99 |
| 4,464,738 A | * | 8/1984 | Czajkowski | 367/97 |
| 4,910,717 A | * | 3/1990 | Terry | 367/99 |
| 6,009,630 A | * | 1/2000 | Rando | 33/365 |
| 6,202,312 B1 | * | 3/2001 | Rando | 33/227 |
| 6,459,483 B1 | * | 10/2002 | Shafer et al. | 356/247 |
| 6,502,319 B1 | * | 1/2003 | Goodrich et al. | 33/286 |
| 2003/0231303 A1 | * | 12/2003 | Raskin et al. | 356/247 |

* cited by examiner

*Primary Examiner*—Tuyet Vo
*Assistant Examiner*—Leith A. Al-Nazer
(74) *Attorney, Agent, or Firm*—Wesley W. Muller; Bruce S. Shapiro; John Yun

(57) ABSTRACT

A laser level disposable on a reference surface includes a housing, a laser diode disposed within the housing for emitting a laser beam along a path, a lens disposed in the path for converting the laser beam into a planar beam. The planar beam thus forms a line on the reference surface. The laser level also includes an electronic distance measurement circuit disposed within the housing for measuring distance. The distance measurement circuit including a display for showing the measured distance.

14 Claims, 2 Drawing Sheets

LASER LEVEL

CROSS-REFERENCE TO RELATED APPLICATIONS

This application is a continuation-in-part of U.S. application Ser. No. 10/277,474, filed Oct. 22, 2002, now U.S. Pat. No. 6,914,930, which in turn derives priority under 35 USC § 119(e) from U.S. Application Ser. No. 60/384,673, filed on May 31, 2002.

FIELD OF THE INVENTION

This invention relates generally to laser instruments and specifically to laser levels with additional non-leveling capabilities.

BACKGROUND OF THE INVENTION

Laser levels have been used in construction for many years. They typically seek to produce a plane of light for a reference for construction projects. Laser levels have been used for large scale construction projects like commercial excavating, laying foundations, and installing drop ceilings. Laser levels save considerable time during initial layout of a construction job compared to other tools such as beam levels, chalk lines, or torpedo levels. Some examples of jobs where laser levels would be useful include laying tile, mounting cabinets, installing counter tops, and building outdoor decks.

It is an object of the present invention to provide a laser level that is inexpensive and usable by the general public.

SUMMARY OF THE INVENTION

In accordance with the present invention, an improved laser level is employed. The laser level disposable on a reference surface includes a housing, a first laser diode disposed within the housing for emitting a first laser beam along a first path, a lens disposed in the first path for converting the first laser beam into a first planar beam, the first planar beam forming a line on the reference surface, and an electronic distance measurement circuit disposed within the housing for measuring distance, said distance measurement circuit including a display for showing the measured distance.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 3 illustrates a second embodiment of the laser level, where

DETAILED DESCRIPTION

Figure 1:
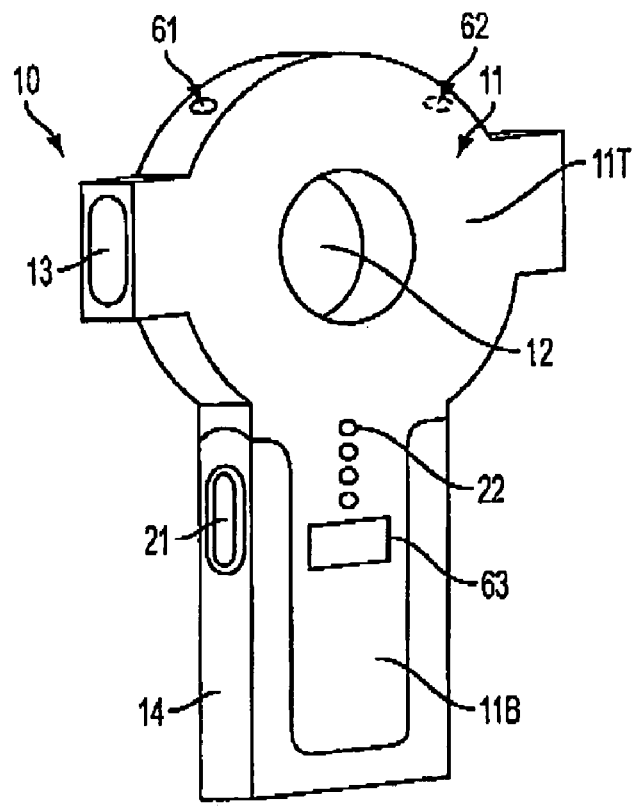
FIG. 1 is a perspective view of a first embodiment of a laser level according to the invention.
Figure 2:
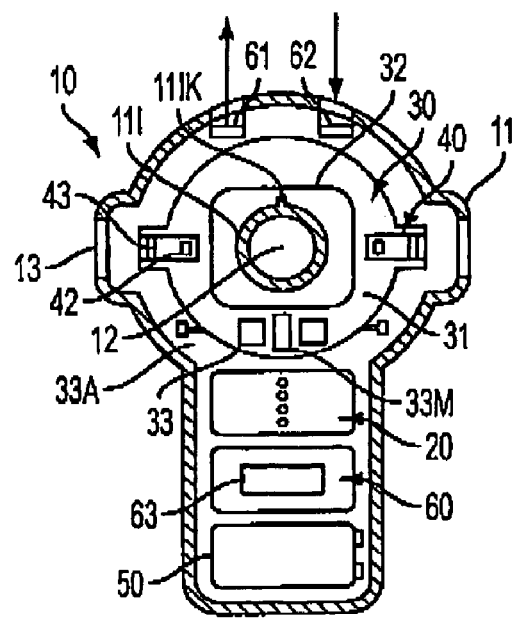
FIG. 2 is a cross-sectional view of the laser level of FIG. 1.

The invention is now described with reference to the accompanying figures, wherein like numerals designate like parts. Referring to FIGS. 1–2, a laser level 10 may have a housing 11. The housing 11 may have a top portion 11T and a bottom portion 11B. The housing may also have a hole 12 extending through the housing 11. The hole 12 preferably extends through the top portion 11T. The perimeter of the hole 12 may be defined by an inner wall 11I.

The top portion 11IT may carry a pendulum assembly 30. Preferably, the pendulum assembly 30 has a main body 31, which may be made of metal or plastic. Main body 31 may be disposed on a knife edge 11IK. Knife edge 11IK may be connected to and/or supported by inner wall 11I. Alternatively, knife edge 11IK may be connected to and/or supported by housing 11. Persons skilled in the art will recognize that pendulum assembly 30 may be supported by means other than knife edge 11IK, such as a pin, bearing, point or other pendulous means.

The main body 31 may carry at least one laser assembly 40 and preferably two laser assemblies 40 disposed left and right of the knife edge 11IK. Persons skilled in the art will recognize that a laser assembly 40 may disposed above knife edge 11IK. Persons skilled in the art will also recognize that the laser assemblies 40 will emit laser beams. Accordingly, it is preferable to provide housing 11 with windows 13 to allow the laser beams to exit from housing 11.

Persons skilled in the art will recognize that such arrangement will provide a self-leveling pendulum assembly that will emit substantially horizontal laser beams (and a substantially vertical laser beam if a laser assembly 40 is disposed above knife edge 11IK and is directed upwardly) when laser level 10 is disposed against a wall. Persons skilled in the art will also recognize that it is preferable to allow laser assembly 40 to be angularly adjusted along a vertical plane relative to main body 31, to ensure that the projected laser beam is substantially horizontal when the main body 31 is at its stationary position.

Persons skilled in the art should refer to U.S. application Ser. Nos. 10/277,474 and 60/384,673, which are wholly incorporated herein by reference, for further information on such laser level, adjustment methods, etc.

Referring to FIGS. 1–2, main body 31 may also have weights 33 to provide a lower center of gravity, and enhance the performance of the pendulum assembly 30. In addition, main body 31 may have at least one adjustment screw 33A to adjust the center of gravity of pendulum assembly 30, as necessary.

Main body 31 may also have a plaque 33M, made of magnetic material, ferrous material or non-ferrous conductive material, such as zinc or copper. Plaque 33M preferably is aligned with at least one magnet (and preferably two magnets) disposed in housing 11, e.g., on the inside of the front and rear walls of housing 11, for providing a damping action on pendulum assembly 30. Basically, eddie currents are generated within plaque 33M, as the plaque moves and interacts with the magnetic field supplied by the magnet(s).

Persons skilled in the art shall recognize that pendulum assembly 30 is preferably wholly contained within housing 11. However, the pendulum assembly 30 may be at least partly, if not completely, disposed outside of housing 11.

Persons skilled in the art shall recognize that a damping mechanism for damping the motion of pendulum assembly 30 may be provided. Persons skilled in the art are directed to the damping mechanism disclosed in U.S. Pat. No. 5,144,487, which is wholly incorporated by reference herein, as well as to its equivalents.

The bottom portion 11B of housing 11 may carry a battery 50 for powering the laser assemblies 40. In addition, the bottom portion 11B may carry a stud sensor circuit 20. The circuitry of the stud sensor circuit 20 is not illustrated herein. Persons skilled in the art are referred to U.S. Pat. Nos. 4,099,118 and 4,464,622, which are wholly incorporated herein by reference.

As is well known in the art, the stud sensor circuit 20 may include an on/off actuator or switch 21, which can be a push-button type actuator. Stud sensor circuit 20 may also include light emitting diodes 22 to display the location of a stud.

It is preferable to align the sensors within stud sensor circuit 20 with the center of hole 12, so that the center of hole 12 indicates the location of the stud.

Persons skilled in the art should recognize that detector circuits other than stud sensor circuit 20 may be provided in laser level 10. Preferably, these detector circuits can detect features underneath a surface, such as a wall or floor. These features may include pipes or wires. Circuits for pipe and wire detectors, as well as other detector circuits, are well known in the art.

The housing 11 may be formed from a hard impact resistant, preferably moldable material such as a hard thermoplastic material such as ABS or polystyrene. It is preferable to provide a grip 14 on bottom portion 11B. Grip 14 may be made of a soft or low durometer thermoplastic elastomer. In addition, grip 14 can be formed from any of the so-called "soft-touch" elastomer materials, such as those sold under the tradenames "Santoprene", "Kraton" and "Monprene," and are preferably adhered or overmolded to the housing 11.

The bottom portion 11B may also carry an electronic distance measuring circuit 60. The circuitry of the distance measuring circuit 60 is not illustrated herein. Persons skilled in the art will know that there are two main types of electronic distance measuring systems: those which are laser-based and those which are sound-based. Persons skilled in the art are referred to U.S. Pat. Nos. 4,097,148, 5,262,837, 5,455,669, 5,638,163, 5,949,530, and 6,057,910, which are wholly incorporated herein by reference, which disclose laser-based electronic distance measuring systems. Similarly, persons skilled in the art are referred to U.S. Pat. Nos. 4,451,909, 4,464,738, and 4,910,717, which are wholly incorporated herein by reference, which disclose sound-based electronic distance measuring systems.

As is typical in electronic distance measuring systems, a sound or laser transmitter 61 is placed in housing 11. The transmitter 61 sends a signal, which contacts the target and bounces back towards the laser level 10. This signal is received by a sound or laser receiver 62 placed in housing 11. The distance measuring circuit 60 processes the data and calculates the distance, as is well known in the art. The calculated distance can then be displayed on a display 63 disposed on housing 11.

Referring to FIG. 2, laser assemblies 40 are disposed on main body 31. Laser assembly 40 may include a substantially cylindrical barrel 41, which may be adjustably connected to main body 31, laser diode 42 disposed in barrel 41, and a line lens 43 disposed in barrel 41. Persons skilled in the art will recognize that in the preferred embodiment, adjusting barrel 41 will result in moving laser diode 42 and line lens 43. In addition, persons skilled in the art will recognize that a collimating lens may be disposed between laser diode 42 and line lens 43. Preferably, line lens 43 converts the laser beam exiting laser diode 42 into a planar beam.

Accordingly, when laser level 10 is disposed against a wall, laser assembly 40 will preferably emit a laser plane that contacts the wall, forming a laser line on the wall.

Persons skilled in the art will recognize that it is preferable to orient the laser assemblies 40 in such manner so that at least a portion of the laser plane will contact the wall. In addition, persons skilled in the art will recognize that providing laser assemblies 40 on the pendulum assembly 30 discussed above will preferably result in laser level 10 projecting substantially horizontal laser lines against the wall (and a substantially vertical laser beam if a laser assembly 40 is disposed above knife edge 11IK and is directed upwardly).

Figure 3A:
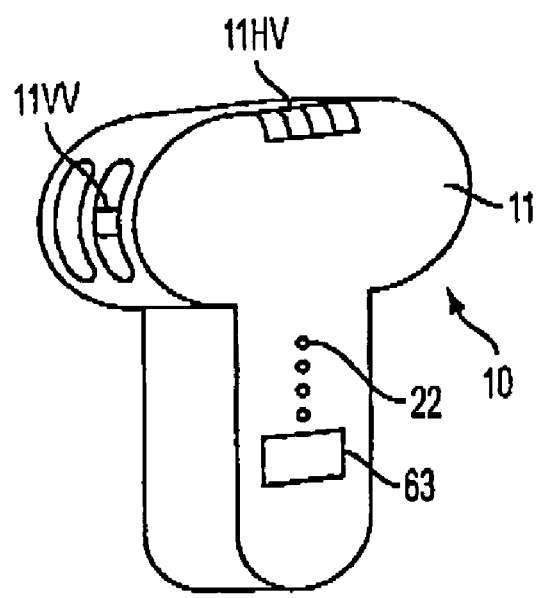
FIGS. 3A–3B are perspective and cross-sectional views of the laser level, respectively.
Figure 3B:
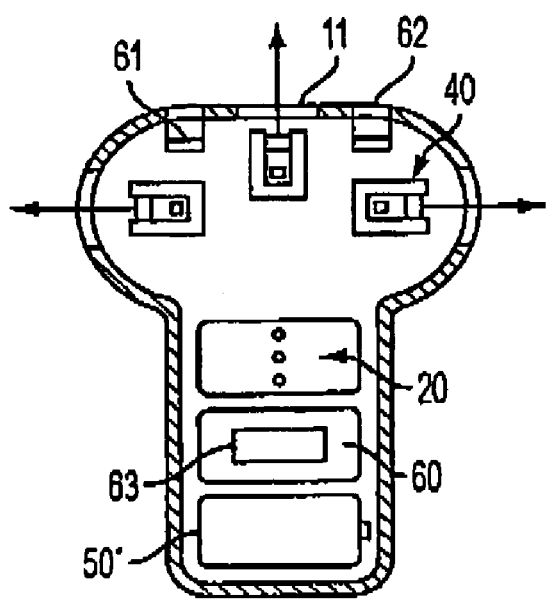

A second embodiment of laser level 10 is shown in FIG. 3, where like numerals refer to like parts. The teachings of the first embodiment above are wholly incorporated by reference in the present embodiment. Like before, laser level 10 has laser assemblies 40 for projecting laser beams, preferably in the form of planes. Furthermore, laser level 10 has a stud sensor circuit 20.

Laser level 10 may also have an electronic distance measuring circuit 60 as in the previous embodiment.

In this embodiment, the main difference is that the laser assemblies 40 are not disposed on a pendulum. Instead, they are fixedly connected to housing 11. Accordingly, the user can disposed housing 11 at any position against a wall or floor, and two laser lines will be emitted unto the wall or floor.

A horizontal bubble vial 11HV may be provided on housing 11 to indicate to the user when the laser beams are level, i.e., substantially horizontal. Similarly, a vertical bubble vial 11VV may be provided on housing 11 to indicate to the user when the laser beams are plumb, i.e., substantially vertical. Persons skilled in the art will recognize that other means for detecting and indicating whether the laser beams are plumb or level can be used. In addition, persons skilled in the art will recognize that it may be preferable to dispose at least one laser assembly 40 at 90° from another laser assembly 40, to emit a perpendicular laser beam or line.

Persons skilled in the art may recognize other additions or alternatives to the means disclosed herein. However, all these additions and/or alterations are considered to be equivalents of the present invention.

The invention claimed is:

1. A laser level disposable on a substantially vertical reference surface comprising:
    a housing;
    a pendulum pivotably connected to the housing;
    a first laser diode disposed on the pendulum for emitting a first laser beam along a first path;
    a first lens disposed on the pendulum in the first path for converting the first laser beam into a first planar beam, the first planar beam forming a first line on the reference surface; and
    an electronic distance measuring circuit disposed in the housing for measuring distance.

2. The laser level of claim 1, further comprising a second laser diode disposed on the pendulum for emitting a second laser beam along a second path, and a second lens disposed on the pendulum in the second path for conveying the second laser beam into a planar beam, the planar beam forming a second line on the reference surface.

3. The laser level of claim 1, wherein the distance measuring circuit comprises a laser transmitter.

4. The laser level of claim 1, wherein the distance measuring circuit comprises a laser receiver.

5. The laser level of claim 1, wherein the distance measuring circuit comprises a sound transmitter.

6. The laser level of claim 1, wherein the distance measuring circuit comprises a sound receiver.

7. The laser level of claim 1, wherein the distance measuring circuit comprises a display disposed on the housing.

8. The laser level of claim 1, further comprising a second laser diode disposed in the housing for emitting a second laser beam along a second path, and a second lens disposed on the pendulum in the second path for converting the second laser beam into a second planar beam, the second planar beam forming a second line on the reference surface.

9. The laser level of claim 8, wherein the first and second lines are substantially perpendicular.

10. The laser level of claim 1, further comprising a detector circuit disposed in the housing for detecting a feature behind or underneath the reference surface.

11. The laser level of claim 10, wherein the detector circuit detects at least one of the group consisting of studs, wire and pipes.

12. The laser level of claim 1, wherein the housing at least partially encloses the pendulum.

13. The laser level of claim 1, wherein the housing has at least one window for allowing the first planar beam to exit therethrough.

14. The laser level of claim 1, further comprising at least one bubble vial on the housing.

* * * * *